United States Patent
Wisniewski et al.

(10) Patent No.: US 11,057,359 B2
(45) Date of Patent: Jul. 6, 2021

(54) KEY ENCRYPTION KEY ROTATION

(71) Applicant: salesforce.com, inc., San Francisco, CA (US)

(72) Inventors: Scott Wisniewski, Issaquah, WA (US); David Murray, Seattle, WA (US); Xiongjian Fu, Sammamish, WA (US); Harish Krishnamurthy, Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 179 days.

(21) Appl. No.: 16/102,191

(22) Filed: Aug. 13, 2018

(65) Prior Publication Data
US 2020/0053065 A1 Feb. 13, 2020

(51) Int. Cl.
*H04L 29/06* (2006.01)
*H04L 9/08* (2006.01)

(52) U.S. Cl.
CPC ............ *H04L 63/06* (2013.01); *H04L 9/0822* (2013.01); *H04L 9/0877* (2013.01); *H04L 9/0894* (2013.01); *H04L 2463/062* (2013.01)

(58) Field of Classification Search
CPC ..... H04L 63/06; H04L 9/0822; H04L 9/0894; H04L 9/0877; H04L 2463/062; H04L 2209/76; H04L 9/0891; H04L 9/08; H04L 9/083; H04L 9/0833; H04L 63/04; H04L 63/0428; H04L 63/062; H04L 63/065; H04L 63/068
See application file for complete search history.

(56) References Cited

U.S. PATENT DOCUMENTS

| | | | |
|---|---|---|---|
| 9,530,011 B2 * | 12/2016 | French | H04L 9/088 |
| 9,544,140 B1 * | 1/2017 | Bhatia | H04L 9/34 |
| 9,608,813 B1 * | 3/2017 | Roth | H04L 9/0894 |
| 2013/0227303 A1 * | 8/2013 | Kadatch | G06F 21/6218 713/193 |
| 2016/0154963 A1 * | 6/2016 | Kumar | H04L 9/0822 713/189 |
| 2019/0013936 A1 * | 1/2019 | Murray | G06F 21/602 |
| 2019/0173674 A1 * | 6/2019 | Agarwal | H04L 9/0822 |

* cited by examiner

*Primary Examiner* — Robert B Leung
*Assistant Examiner* — Adrian Stoica
(74) *Attorney, Agent, or Firm* — Holland & Hart LLP

(57) ABSTRACT

A set of hardware security modules (HSMs) in a database system may implement a key management system with a database storing encryption keys or other secrets. The set of HSMs may identify a first key encryption key (KEK) and a second KEK stored in the set of HSMs. The set of HSMs may retrieve, from the database, a set of encryption keys encrypted by the first KEK and decrypt each encryption key of the set of encryption keys using the first KEK. The set of HSMs may re-encrypt each encryption key of the set of encryption keys with the second KEK and transmit, to the database, the set of encrypted encryption keys encrypted by the second KEK for storage. Then, the set of HSMs may delete the first KEK from the set of HSMs.

14 Claims, 11 Drawing Sheets

KEY ENCRYPTION KEY ROTATION

FIELD OF TECHNOLOGY

The present disclosure relates generally to database systems and data processing, and more specifically to key encryption key rotation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support techniques for encrypting data stored within the system to enhance security. For example, a database may store tenant-provided data encryption keys (DEKs), which may themselves be encrypted by key encryption keys (KEKs). If an encrypted DEK is obtained from the database, it may be possible to decrypt the DEK with the corresponding KEK, and to therefore decrypt and obtain the data. In such systems, even if a DEK is deleted by the database, other copies of the DEK, such as a copy from a backup, may still be decoded.

DETAILED DESCRIPTION

Figure 1:
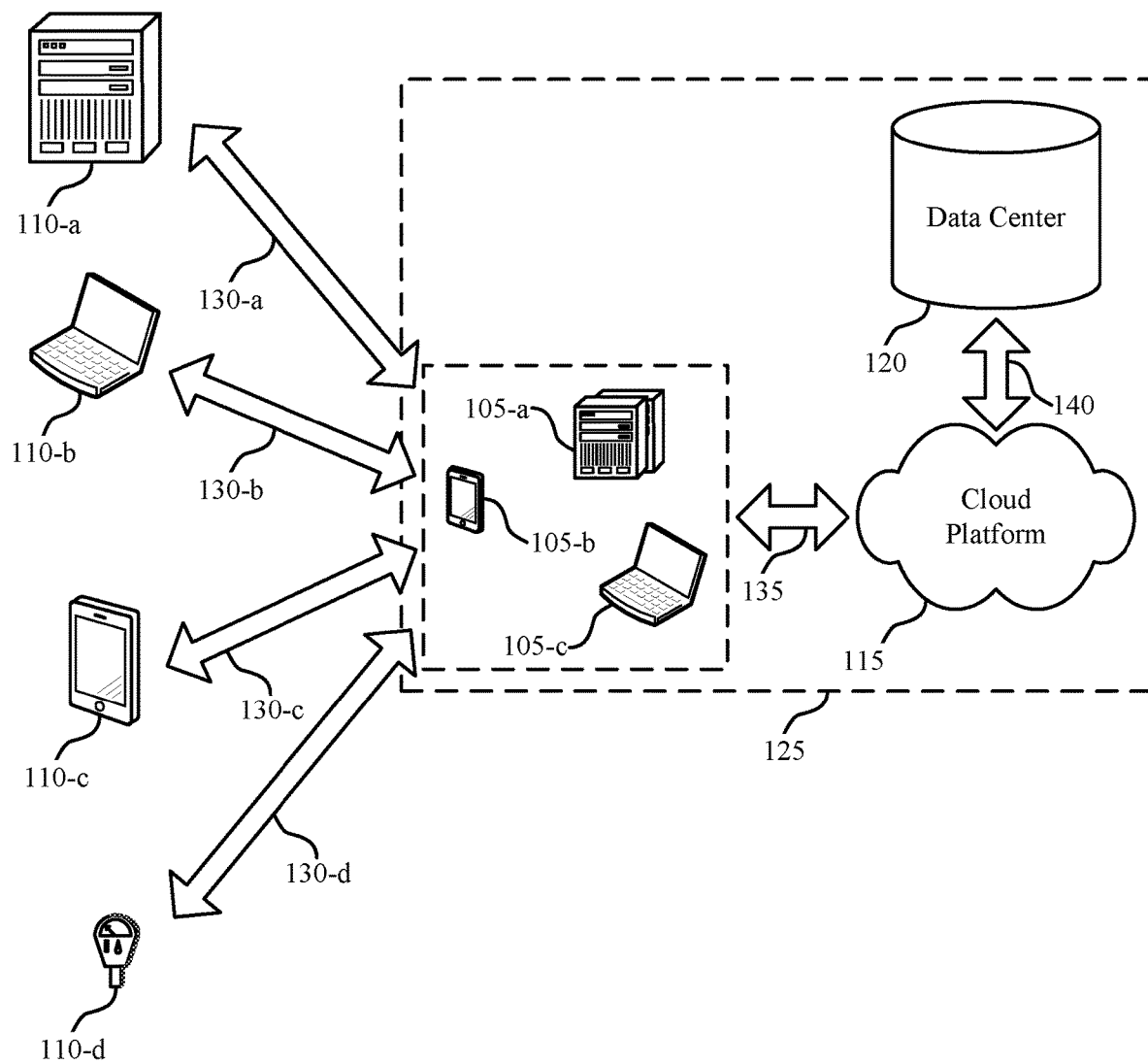
FIG. 1 illustrates an example of a system for key encryption key rotation that supports key encryption key rotation in accordance with aspects of the present disclosure.

Tenants of a multi-tenant database system may provide their own encryption keys for encrypting their data. Such encryption keys may be referred to as data encryption keys (DEKs). The database system may encrypt the encryption keys using a key encryption key (KEK). The KEKs may be stored in a secure server, which may include hardware security modules (HSMs). The database system and the HSMs may employ a key management system, which provides control to customers of the key management system (e.g., the tenants of the database system) over keys stored in the database as well as security for the stored keys. In a "bring your own key" (BYOK) scheme, a tenant provides their own DEKs to the database system, the DEKs are encrypted by a KEK stored in an HSM, and the tenant can manage their DEKs stored in the database. In some cases, even though a DEK is encrypted by a KEK, if a copy of an encrypted DEK is obtained from the database (e.g., by a hacker), it may be possible to use the KEK to decrypt the DEK and therefore decrypt the data stored in the database system.

In accordance with aspects of the present disclosure, a key management system may support KEK rotation. Each tenant-provided encryption key (e.g., BYOK DEKs) stored in a database may be encrypted by a first KEK. The first KEK may be stored in a set of HSMs and exist only in the set of HSMs. A KEK rotation may be triggered, where the set of HSMs may generate a new, or a second, KEK. The set of HSMs may then retrieve each BYOK DEK encrypted with the first KEK, decrypt each of the BYOK DEKs encrypted by using the first KEK, re-encrypt the BYOK DEKs using the second KEK, and send the re-encrypted BYOK DEKs back to the database for storage. Once each BYOK DEK in the database has been re-encrypted with the second KEK and none of the BYOK DEKs are encrypted with the first KEK, the set of HSMs may delete the first KEK. By deleting the first KEK, the set of HSMs may be cryptographically unable to decrypt DEKs encrypted by the first KEK.

In some examples, the KEK rotation process may be triggered based on a request from a tenant, a severance of services to a tenant, a request to sever services to a tenant, an expiration of a timer, a connection status of the HSMs or the database, or any combination of these events. In some cases, a KEK may be exportable from one HSM to another HSM of the set of HSMs, but the KEK may not be exportable to other places (e.g., other HSMs not associated with the key management system, other databases, stores, or servers, etc.). In some examples, the set of HSMs, the database, or another component of the key management system may receive a request to decrypt a secret encrypted by an old, deleted KEK. The key management system may be unable to provide the secret based on having deleted the old KEK encrypting the secret.

Aspects of the disclosure are initially described in the context of an environment supporting an on-demand database service. Aspects of the disclosure are further illustrated by and described with reference to apparatus diagrams, system diagrams, and flowcharts that relate to key encryption key rotation.

FIG. 1 illustrates an example of a system 100 for cloud computing that supports key encryption key rotation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transmission control protocol/internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the key management system described herein may be an example of or be implemented by aspects of the data center 120. For example, the data center 120 may store a set of HSMs and a database. In some cases, the HSMs and the database may be in a similar geographic location (e.g., a common warehouse or data storage facility), or the HSMs and the database may be in separate geographic locations (e.g., different warehouses or different data storage facilities). In some cases, the database may include one or more clusters of nodes. In some cases, the database may use clusters of nodes to support horizontal partitioning. The nodes may similarly be in a common geographical location or located in separate geographical locations.

The key management system in the data center 120 may interface with one or more cloud clients 105 via the cloud platform 115. In some cases, a cloud client 105 may be an example of a tenant of the database, and the cloud client 105 may provide secrets, such as DEKs or other encryption keys, to the database to be handled by the key management system. For example, a DEK supplied by the cloud client 105 may be used to encrypt data for contacts 110. The cloud client 105 may use the key management system to securely manage the encryption keys used to encrypt the data of the contacts 110.

In some cases, the cloud platform 115 may include aspects of an API for the key management system. In some cases, the cloud platform 115 may provide an interface for the cloud clients 105 to control secrets managed by the key management system. As an example, a cloud client 105 may request for a key encryption key stored in an HSM at the data center 120 to be deleted, and the key management system may initiate a KEK rotation as described herein. Or, in some examples, a tenant may terminate services with the key management system via the cloud platform 115. In some cases, in response to the termination, the key management system may return any secrets stored by the key management system or perform a KEK rotation, or both. In some cases, if a tenant requests that a DEK is deleted from the database, the DEK may not be re-encrypted by the new KEK during the next KEK rotation. A cloud client 105 may also be able to provide or request secrets managed by the key management system via the cloud platform 115.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
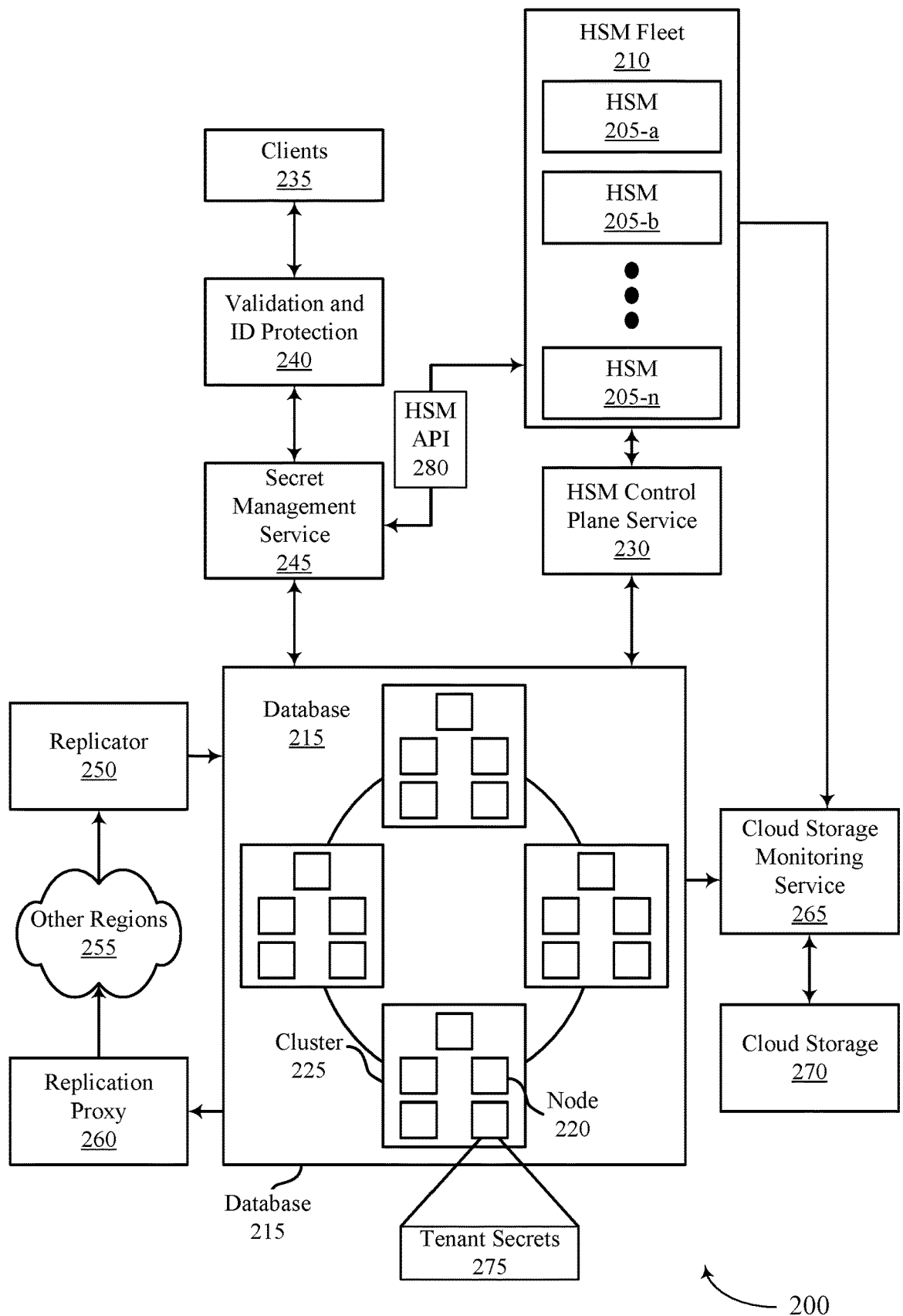
FIG. 2 illustrates an example of a key management system that supports key encryption key rotation in accordance with aspects of the present disclosure.

FIG. 2 illustrates an example of a key management system 200 that supports key encryption key rotation in accordance with aspects of the present disclosure. The key management system 200 may securely store and manage cryptographic keys. The key management system 200 may be an example of or include components of data center 120 described with reference to FIG. 1. The key management system 200 may include an HSM fleet 210, including one or more HSMs 205.

For example, the HSM fleet 210 may include HSM 205-a and HSM 205-b through HSM 205-n. In an example, the HSM fleet 210 may include six HSMs 205, with three additional HSMs 205 not shown. An HSM 205 of the HSM fleet 210 may manage digital keys for strong authentication and may perform processes to encrypt data, encryption keys, or both. The HSMs 205 may each store a KEK as described herein. The HSMs 205 may store conventional KEKs used to encrypt keys stored in a database 215, and the HSMs 205 may also store KEKs used to encrypt DEKs provided under a BYOK scheme described herein.

The key management system 200 may also include a database 215. In some cases, the database 215 may be a single server, a horizontally-scalable key/value store, or a distributed data store. In an example, the database 215 may be a Zookeeper hash ring. The database 215 may store encrypted secrets. A DEK may be an example of an encrypted secret. The encrypted secrets may be stored in the database 215 in one or more clusters 225. The clusters 225 may organize the encrypted secrets to improve management of the encrypted secrets in the database 215. For example, the clusters 225 may support horizontal partitioning of the database 215. In some examples, the clusters 225 may be organized based on hash value, tenant association, time stamp, or key type, among other organizable criteria.

Each cluster 225 may support or include a number of nodes 220. A node 220 may be an example of a device or machine used for processing or data storage. A node 220 may be a physical device or a virtual partition of a device. In the illustrated example, each cluster 225 may support five nodes 220. In some cases, a node 220 may store a set of tenant secrets 275 or be used to handle processing associated with the set of tenant secrets 275, or both. In some cases, the tenant secrets 275 may be encrypted. For example, the tenant secrets 275 may be encryption keys such as DEKs. In some examples, the tenant secrets 275 may be encrypted by keys, such as KEKs, which are stored in the HSM fleet 210. In some cases, nodes 220 may be grouped into a cluster 225 based on geographical location, capabilities, tenant association, or any combination of these factors. In an example, each node 220 in a first cluster 225 may be for a same tenant of the database 215. In the example, the nodes 220 of the first cluster 225 may be associated with an availability, storage capacity, or server latency requested by or associated with the tenant.

Tenants may supply keys which are securely stored in the database 215. The tenant may provide, for example, DEKs to the key management system 200, and the DEKs may be used to encrypt data at another server. The key management system 200 may provide foundational support to enable tenants to manage encryption keys stored in the database 215. For example, the key management system 200 may securely import the keys generated by the tenants and offer a strong deletion service level agreement (SLA) by implementing techniques described herein.

The tenant secrets 275, such as DEKs, managed by the key management system 200 may be encrypted by a KEK. A KEK may be stored in the HSMs 205 of the HSM fleet 210. Each DEK may be retrieved by the HSM fleet 210 and wrapped, or encrypted, by the KEK in an HSM 205. After encrypting the DEK, the HSM fleet 210 may transmit the encrypted DEK back to the database 215.

The key management system 200 may support KEK rotation for KEKs used to encrypt DEKs provided by tenants of the database 215. In KEK rotation, the HSM fleet 210 may re-encrypt each DEK (e.g., each BYOK DEK) in the database 215 using a newly generated KEK and delete the previously-used KEK. For example, the HSM fleet 210 may have encrypted each DEK in the database 215 using a first KEK. An HSM 205 of the HSM fleet 210 may generate a new KEK and propagate the new KEK to the rest of the HSMs 205 in the HSM fleet 210. The HSM fleet 210 may retrieve each DEK stored in the database 215 encrypted by the first KEK and decrypt the DEKs using the first KEK. The HSM fleet 210 may then re-encrypt each DEK of the database 215 using the new KEK. Once each DEK of the database 215 is re-encrypted using the new KEK, the HSM fleet 210 may delete the first KEK. Because the KEKs are stored only in the HSM fleet 210, the first KEK may be effectively permanently deleted and unrecoverable.

If an unauthorized party were to obtain a DEK encrypted by a previously-used KEK and attempt to compel the key management system 200 to decrypt the DEK, the key management system 200 would be unable to decrypt the DEK based on the old KEK, because the old KEK has been permanently deleted from the key management system 200. Thus, tenants of the database 215 whose keys are managed by the key management system 200 are provided an additional level of security for the managed keys, even if the tenant is no longer provided services by the key management system 200.

The HSMs 205 may implement an HSM API 280 and run a small amount of software to ensure security of the HSMs 205. New code for the HSMs 205 may be signed before being uploaded to the HSMs 205. Each HSM 205 may store a Rivest-Shamir-Adleman (RSA) key pair generated at initialization time and signed using an offline certificate authorization. The HSM API 280 running in the HSMs 205 may cryptographically control the export of the KEKs used to encrypt BYOK DEKs. In some cases, the KEKs used to encrypt the BYOK DEKs may be exportable if wrapped using a suitably signed key of another HSM 205. For example, a KEK used to encrypt the BYOK DEKs may be exportable from HSM 205-a to HSM 205-b and other HSMs 205 in the HSM fleet 210. However, the KEK used to encrypt the BYOK DEKs may only be accessible by an official authorized HSM (e.g., an HSM 205 of the HSM fleet 210). The HSMs 205 may also maintain a copy of the BYOK KEK which is non-exportable. The non-exportable BYOK KEK may be used by the secret management service (SMS) 245, which may be used to restrict use of code in the HSMs 205 to key rotation functionality.

Each HSM 205 in the HSM fleet 210 may have a common security configuration and store a set of keys. In some cases, the HSMs 205 may store a master key, which may be derived from a set of smart cards and may be used as the KEK for all non-BYOK keys stored in the database 215. Rotating the master key may be a manual operation involving a signaling ceremony and a quorum of crypto operators. In some cases, the HSMs 205 may include a current BYOK KEK. The current BYOK KEK may be an example of a Rivest-Shamir-Adleman (RSA) key or an elliptic-curve cryptography (ECC) private key stored in non-volatile random-access memory (NVRAM) in the HSMs 205. The current BYOK KEK may be non-exportable from the HSMs 205 and may be rotated automatically after a period (e.g., 24 hours).

In some cases, the KEK rotation process may generate a unique advanced encryption standard (AES) key per BYOK DEK and encrypt each BYOK DEK with a corresponding, unique AES key. The KEK rotation process may then encrypt each unique AES key with the master key. For example, each content key (e.g., BYOK DEK) may have a unique AES key which is encrypted by a single RSA key. In some cases, the single RSA key may be an example of a master KEK key stored in the HSMs 205. For example, the RSA key may be an example of the BYOK KEK described herein, where the RSA key is rotated during the KEK rotation. In some examples, the RSA key may live in (e.g., not leave from) the HSMs 205. In some cases, the AES key may be an example of a DEK-specific KEK. The AES key may also be stored in the database 215.

In some cases, durable copies of the key may only be stored in the HSMs 205. In some examples, the HSMs 205 may include a current BYOK KEK copy, which may be a copy of the BYOK KEK. The copy may be marked as accessible only by codes running within the HSMs 205. The current BYOK KEK copy may be exportable, but only by operation of the key management system 200, and then only if wrapped with the public key of another, authorized HSM 205. For example, the current BYOK KEK copy may be exported from an HSM 205 to be copied to another HSM 205. Authorizing an HSM 205 may include signaling a certificate using an offline certification authority and the approval of a quorum of crypto-operators.

The HSMs 205 may also include a next BYOK KEK. The next BYOK KEK may be the "next" BYOK KEK used to encrypt the BYOK DEKs in the database 215. The next BYOK KEK may be set when propagating KEKs between HSMs 205 during KEK rotation. In some cases, the HSMs 205 may include a next BYOK KEK copy, which may be marked for code-safe-only access. In some cases, the HSMs 205 may include an HSM private key. The HSM private key may be a per-HSM RSA private key generated during the HSM initialization process. The HSM private key may be used to import NVRAM BYOK keys into the HSM during key rotation. The associated public key certificate may be signed by an offline certificate authorization during initialization.

The HSMs 205 may include an import private key, which may be an RSA private key shared by all HSMs 205. The import private key may be used for importing BYOK keys from customers and for encrypting replication messages sent between data centers. The import private key may be rotated automatically after a set period (e.g., after seven days). In some cases, the HSMs 205 may also include a next import private key, which may be set when propagating keys between HSMs and data centers when rotating the import key.

An HSM control plane service 230 may manage the HSM fleet 210. The HSM control plane service 230 may propagate configuration changes to the HSMs 205 in the HSM fleet 210. In some cases, the HSM control plane service 230 may manage BYOK key rotation and re-encrypting BYOK keys in the database 215 during KEK rotation. In some cases, the HSM control plane service 230 may manage code updates for the HSMs 205.

A client 235 may be an example of a tenant of the database 215. The client 235 may provide a set of encryption keys to the database 215 to be managed by the key management system 200. In some cases, the client 235 may interface with the SMS 245 via a validation and ID protection (VIP) service 240. In some cases, the SMS 245 may run behind the VIP 240 in a pass through mode. In some cases, the client 235 may provide encryption keys to or request encryption keys from the database 215 via the VIP 240 and the SMS 245. In some examples, the SMS 245 may implement the HSM API 280. In some cases, the SMS 245 may be an example of a front-end API which may interact with tenants of the database or clients of the key management system.

In some case, a replicator 250 may run in each data center. For example, a replicator 250 may run at the database 215, at each cluster 225, or each node 220. The replicator 250 may be a daemon responsible for polling other data centers for replication log entries. The replicator 250 may detect and resolve conflicts and apply the replication local entries to the local database storage. Each cluster 225 may maintain a transaction log (e.g., stored in the cluster 225) that records edits made to replicated keys in the SMS 245. Updates to the transaction log may be committed as a part of the same database transaction. The replicator 250 may store a checkpoint (e.g., indicating the consumer transition log position for each external pair between a data center and cluster number.

The replication proxy 260 may be an example of a stateless Representational State Transfer (REST) architecture that may serve as a front-end for replicator instances in other data centers. The replication proxy 260 may be exposed to external data centers (e.g., in other regions 255). The replication proxy 260 may return information about a configuration for the database 215. The configuration for the database 215 may include, for example, the number of clusters or partitions currently configured in the data center. In some cases, the replication proxy 260 may fetch transaction log entries for each partition. In some examples, the replication proxy 260 may be a primary owner of a configuration for the database 215. The other services, such as the SMS 245, the replicator 250, the cloud storage monitoring service 265, and the HSM control plane service 230, may query the replication proxy 260 to fetch the configuration for the database 215.

Replication log entries within a data center may be encrypted and stored using an import key used to enable BYOK scenarios. In some cases, the replicator 250 may utilize the same encryption mechanism used by tenants for importing their keys. In some case, objects supporting replication may be decorated with vector clocks, which may be used to detect conflicts during replication. The replicator 250 may be responsible for applying conflict resolution functions to resolve any detected conflicts.

The cloud storage monitoring service 265 may perform continuous monitoring of the SMS 245. In some cases, the cloud storage monitoring service 265 may simulate common customer scenarios. In some cases, the cloud storage monitoring service 265 may orchestrate offline backups for the cloud storage 270. In some cases, the offline backups may be periodic (e.g., once every four hours). The cloud storage monitoring service 265 may also monitor nodes 220 for health. The cloud storage monitoring service 265 may also have a deployment of SMS operation tools, which may be used to diagnose and respond to operational issues.

The cloud storage 270 may store offline backups of data from the database 215. The data may be encrypted a second time (e.g., using a backup key stored in the HSMs 205) before being written to the cloud storage 270. The cloud storage 270 may also be used to store offsite backups of the encrypted HSM configuration.

Figure 3:
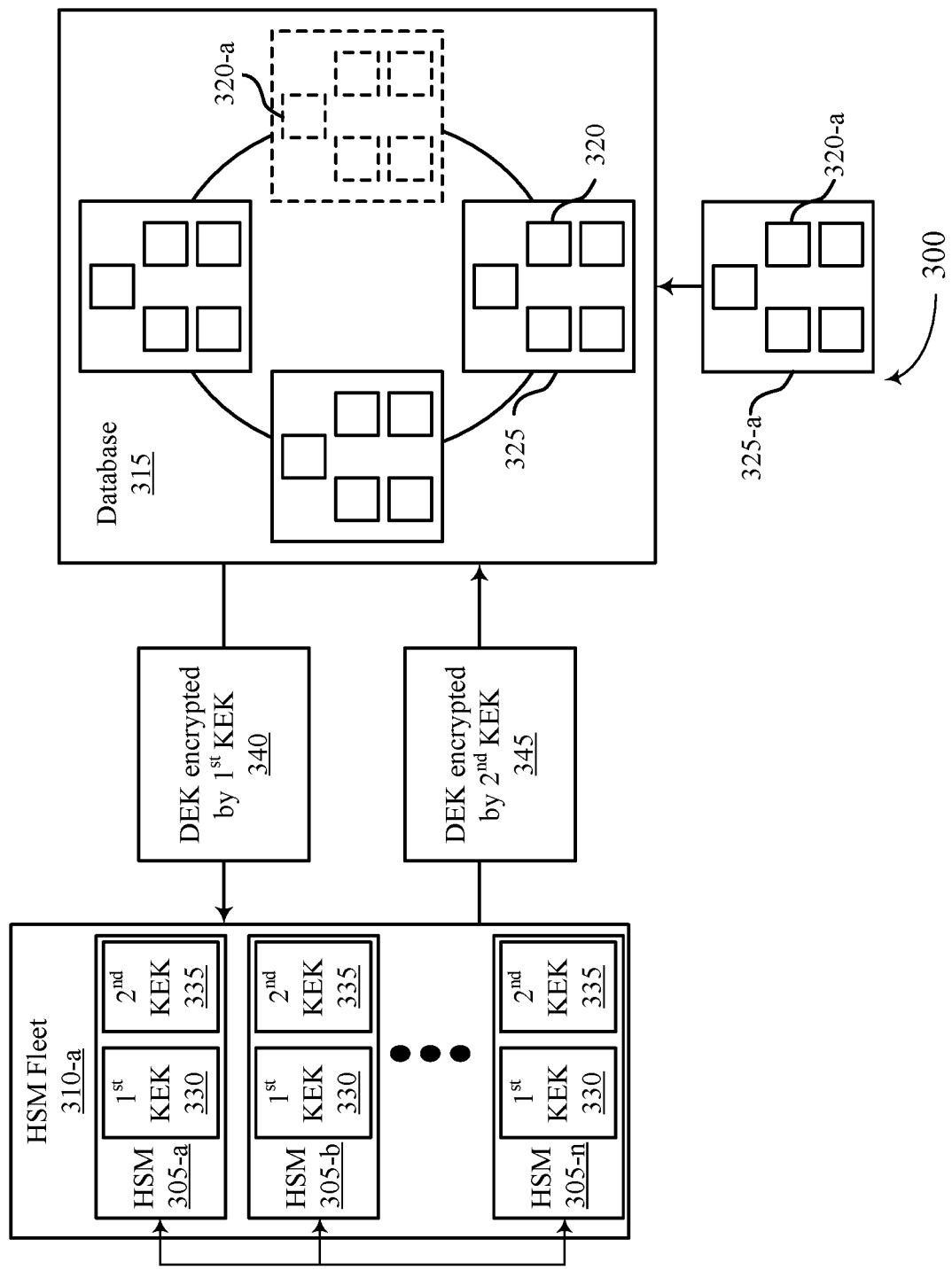
FIG. 3 illustrates an example of a key encryption key rotation that supports key encryption key rotation in accordance with aspects of the present disclosure.

FIG. 3 illustrates an example of a KEK rotation process 300 that supports key encryption key rotation in accordance with aspects of the present disclosure. As described above, a key management system may include an HSM fleet 310 and a database 315. The HSM fleet 310 may include one or more HSMs 305, including HSM 305-a and HSM 305-b through HSM 305-n. The HSM fleet 310 may be an example of an HSM fleet 210 as described in FIG. 2. HSM 305-a and HSM 305-b through HSM 305-n may each be an example of an HSM 205 as described in FIG. 2. The database 315 may be an example of a database 215 as described in FIG. 2.

Tenants of the database 315 may provide keys (e.g., BYOK DEKs) to be managed by the key management service. The HSMs 305 of the HSM fleet 310 may encrypt the BYOK DEKs using a first KEK 330. Each HSM 305 of the HSM fleet 310 may store the first KEK 330. The first KEK 330 may be exclusively stored or otherwise exist only in the HSMs 305.

The KEK rotation process 300 may be triggered by, for example, a timer expiring, a request from a tenant, or a severance of services to a tenant. An HSM 305 of the HSM fleet 310 may generate a second KEK 335, corresponding to the next BYOK KEK described in FIG. 2. The HSM 305 may propagate the second KEK 335 to the other HSMs 305 in the HSM fleet 310. For example, HSM 305-*a* may generate the second KEK 335, wrap the second KEK 335 using a suitably signed off key of another HSM 305, then propagate the second KEK 335 to the other HSMs 305 of the HSM fleet 310. Thus, while performing the KEK rotation process 300, the HSMs 305 may store both the first KEK 330 and the second KEK 335. The following example relates to DEKs provided by tenants of the database 315 in a BYOK scheme. However, the techniques described herein are applicable for KEK rotation using other types of encryption keys.

Once the second KEK 335 has been uploaded to each HSM 305 in the HSM fleet 310, the key management system may iterate over each BYOK DEK in the database 315 and re-encrypt the BYOK DEKs using the second KEK 335. As shown at 340, the HSM fleet 310 may retrieve each DEK encrypted by the first KEK 330 from the database 315. In some cases, the HSM fleet 310 may retrieve the BYOK DEKs encrypted by the first KEK 330 via an HSM control plane service as described in FIG. 2.

The HSM fleet 310 may decrypt the BYOK DEKs encrypted by the first KEK 330 to obtain the BYOK DEKs. The HSM fleet 310 may then encrypt the BYOK DEKs with the second KEK 335. The HSM fleet 310 may retrieve every BYOK DEK from the database 315 which is encrypted by the first KEK 330, decrypt each of the BYOK DEKs, and re-encrypt each of the BYOK DEKs with the second KEK 335. At 345, the HSM fleet 310 may transmit the BYOK DEKs encrypted by the second KEK 335 to the database 315. In some cases, the HSM fleet 310 may include information indicating that the BYOK DEKs encrypted by the second KEK 335 have been re-encrypted using the second KEK 335 (e.g., indicating a KEK version). This information may also be sent to the database 315 at 345. Thus, if a read comes in for a BYOK DEK which has been re-encrypted by the second KEK 335, the database 315 may determine that the second KEK 335 is needed to decrypt that BYOK DEK.

If new keys are uploaded to the database 315, the new keys may be encrypted by the second KEK 335. For example, the database 315 may add cluster 325-*a* to the database 315. Cluster 325-*a* may include multiple nodes 320, including at least node 320-*a*. A cluster 325 and a node 320 may be respective examples of a cluster 225 and a node 220 as described in FIG. 2. BYOK DEKs included in cluster 325-*a* may be uploaded to the database 315 and encrypted by the second KEK 335 once the KEK rotation process 300 has started.

Once each BYOK DEK in the database 315 has been re-encrypted with the second KEK, the HSMs 305 of the HSM fleet 310 may delete the first KEK 330. Upon determining that there are no keys encrypted by the first KEK 330 in the database 315, the first KEK 330 may be deleted by the HSM fleet 310. Once the first KEK 330 is deleted from the HSMs 305, the key management system may not have a way to decrypt BYOK DEKs encrypted by the first KEK 330. For example, if an unauthorized user (e.g., a hacker) were to obtain a BYOK DEK encrypted by the first KEK 330 and request the DEK (or attempt to impermissibly decrypt the DEK using the key management system), the key management system would be cryptographically unable to provide the DEK based on the first KEK 330 being deleted.

Figure 4:
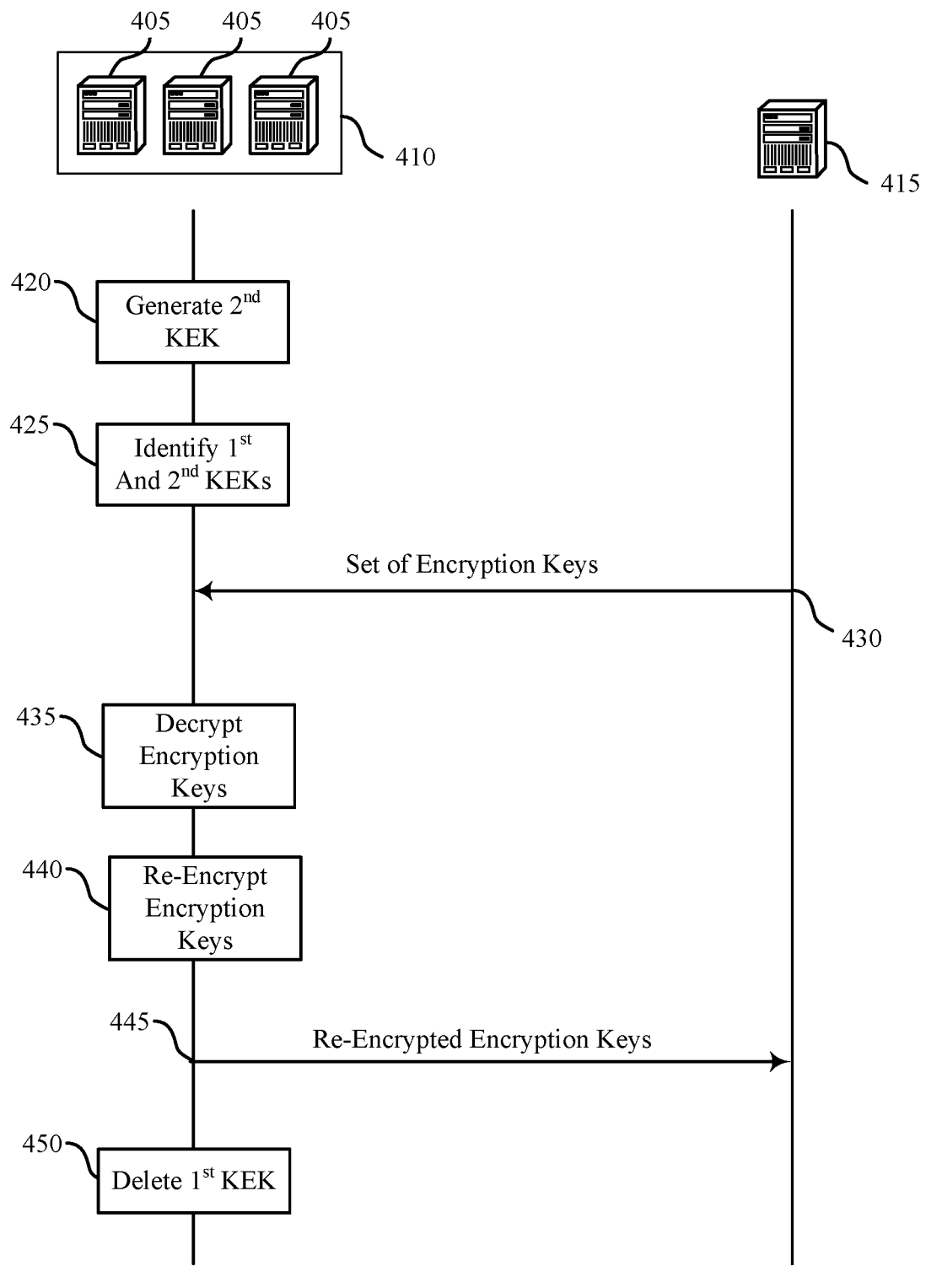
FIG. 4 illustrates an example of a process flow that supports key encryption key rotation in accordance with aspects of the present disclosure.

FIG. 4 illustrates an example of a process flow 400 that supports key encryption key rotation in accordance with aspects of the present disclosure. Process flow 400 may include one or more HSMs 405 in a set of HSMs 410. An HSM 405 may be an example of an HSM 205 or HSM 305 as described in FIGS. 2 and 3. The process flow 400 may also include a database 415, which may be an example of a database 215 or a database 315 as described in FIGS. 2 and 3. The database 415 may include encryption keys, such as BYOK DEKs, encrypted by a first KEK stored in the HSMs 405 of the set of HSMs 410.

A KEK rotation may be triggered based on, for example, receiving a request from a tenant of the database to terminate services, receiving a request from the tenant of the database to delete a key of the set of encryption keys, determining a timer for periodically re-encrypting the set of encryption keys has expired, or a combination of these events. Upon detecting the KEK rotation trigger, the HSM fleet 410 may initiate the KEK rotation process. In some cases, if a tenant requests that a DEK is deleted from the database or if the tenant has terminated services, the DEK may not be re-encrypted by the new KEK during the next KEK rotation.

At 420, the set of HSMs 410 may generate a second KEK at a first HSM 405 of the set of HSMs 410. The first HSM 405 may transmit the second KEK to the other HSMs 405 of the set of HSMs 410.

At 425, the set of HSMs 410 may identify the first KEK and the second KEK stored in the set of HSMs 410.

At 430, the set of HSMs 410 may retrieve, from the database 415, the set of encryption keys encrypted by the first KEK.

At 435, the set of HSMs 410 may decrypt each encryption key of the set of encryption keys using the first KEK.

At 440, the set of HSMs 410 may re-encrypt each encryption key of the set of encryption keys with the second KEK.

At 445, the set of HSMs 410 may transmit, to the database 415, the set of encrypted encryption keys encrypted by the second KEK for storage.

At 450, the set of HSMs 435 may delete the first KEK. In some cases, the set of HSMs may determine that each encryption key of the set of encryption keys is encrypted by the second KEK, then the set of HSMs 410 may delete the first KEK based on the determining. In some cases, the set of HSMs 410 may receive an encryption key encrypted by the first KEK after deleting the first KEK from the set of HSMs 410. The set of HSMs 410 may determine that the encryption key encrypted by the first KEK cannot be decrypted by the second KEK. In some cases, the set of HSMs 410 may be unable to decrypt the encryption key encrypted by the first KEK based on having deleted the first encryption key from the set of HSMs 410.

Figure 5:
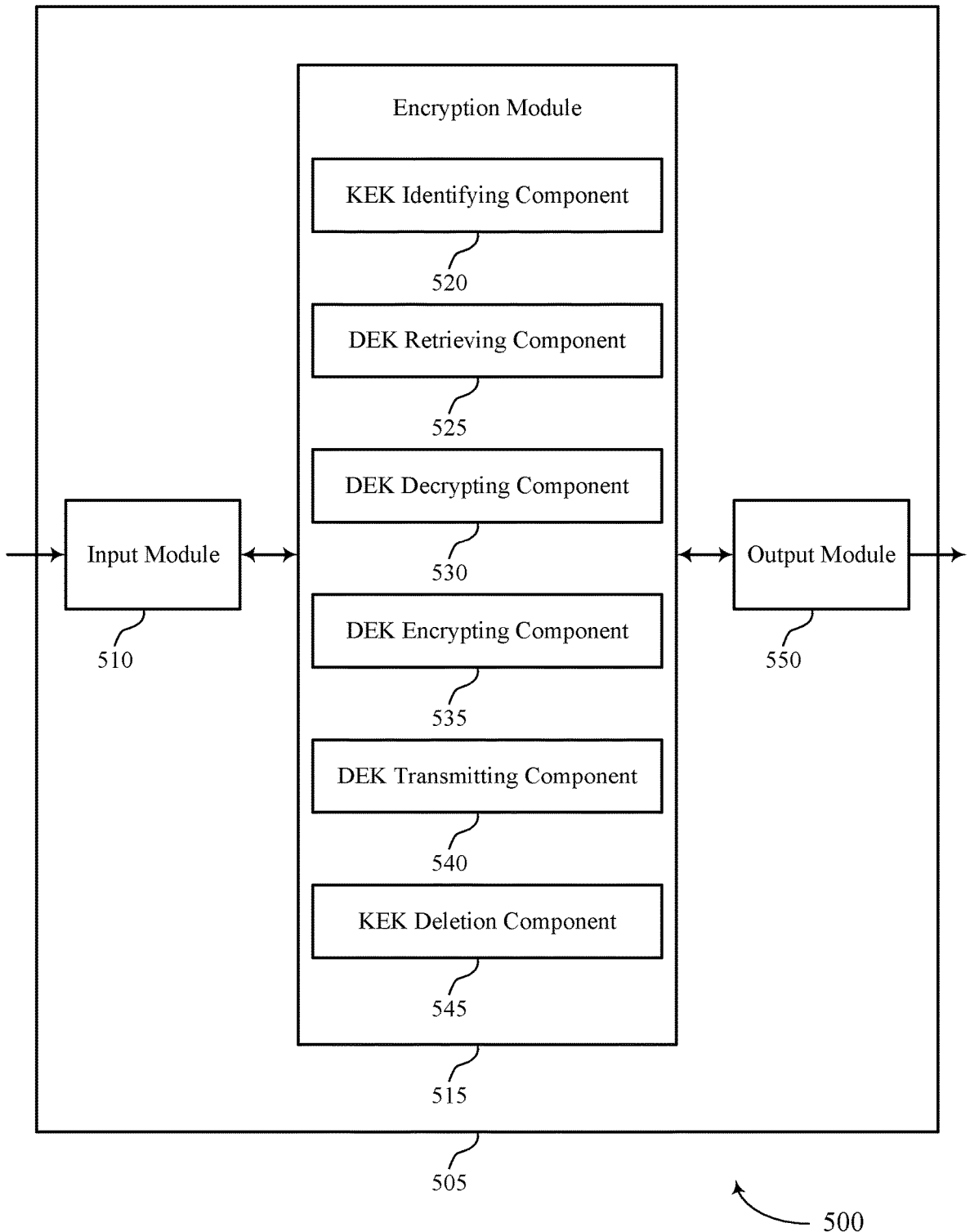
FIG. 5 shows a block diagram of an apparatus that supports key encryption key rotation in accordance with aspects of the present disclosure.

FIG. 5 shows a block diagram 500 of a device 505 that supports key encryption key rotation in accordance with aspects of the present disclosure. The device 505 may include an input module 510, an encryption module 515, and an output module 550. The device 505 may also include a processor. Each of these components may be in communication with one another (e.g., via one or more buses).

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the encryption module 515 to support key encryption key rotation. In some cases, the input module 510 may be a component of an input/output (I/O) controller 715 as described with reference to FIG. 7.

The encryption module 515 may include a KEK identifying component 520, a DEK retrieving component 525, a DEK decrypting component 530, a DEK encrypting component 535, a DEK transmitting component 540, and a KEK deletion component 545. The encryption module 515 may be an example of aspects of the encryption module 710 described herein.

The KEK identifying component 520 may identify a first KEK and a second KEK stored in the set of HSMs. The DEK retrieving component 525 may retrieve, from a database, a set of encryption keys encrypted by the first KEK. The DEK decrypting component 530 may decrypt each encryption key of the set of encryption keys using the first KEK. The DEK encrypting component 535 may re-encrypt each encryption key of the set of encryption keys with the second KEK. The DEK transmitting component 540 may transmit, to the database, the set of encrypted encryption keys encrypted by the second KEK for storage. The KEK deletion component 545 may delete the first KEK from the set of HSMs.

The output module 550 may manage output signals for the apparatus 505. For example, the output module 550 may receive signals from other components of the apparatus 505, such as the encryption module 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
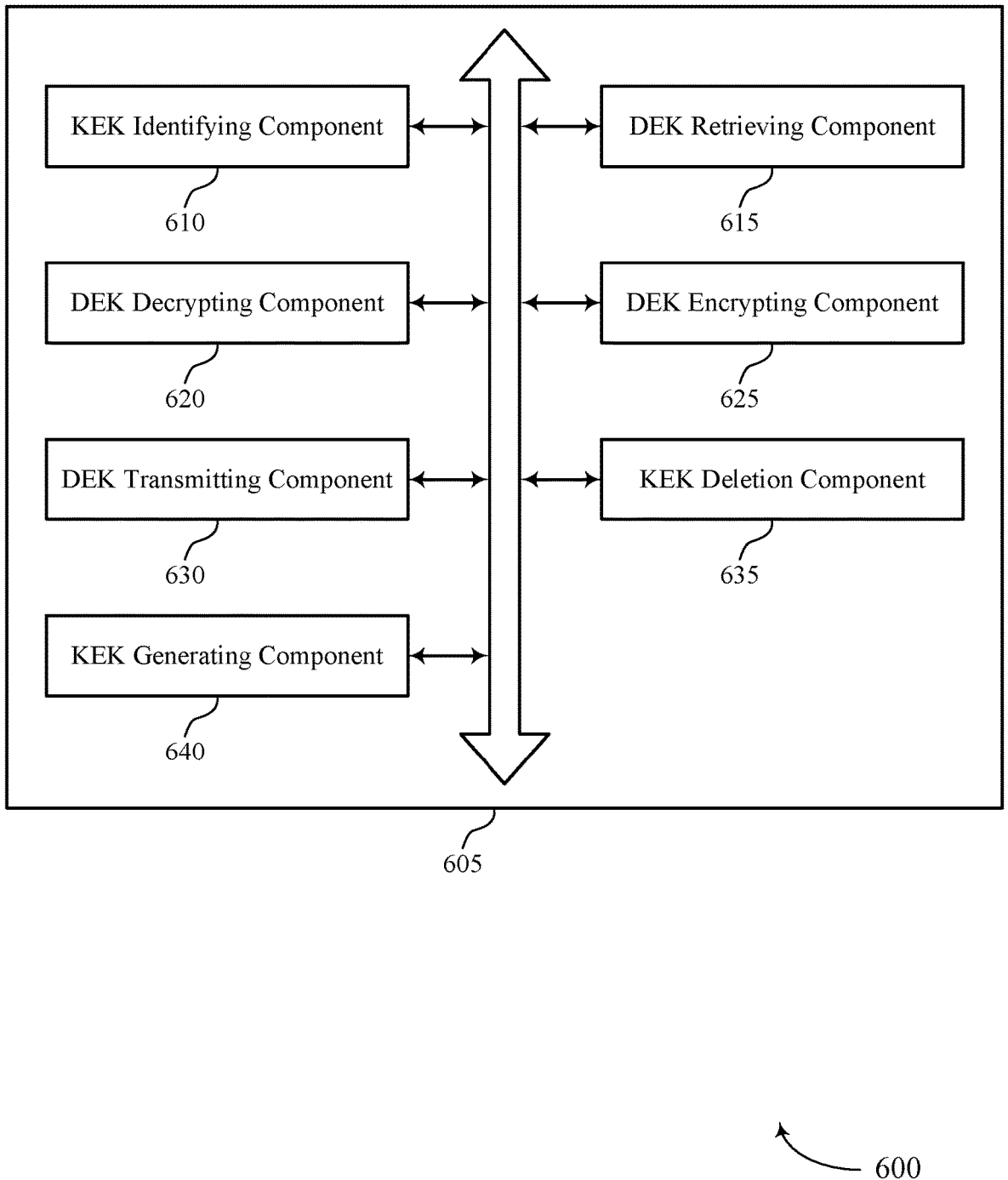
FIG. 6 shows a block diagram of an encryption module that supports key encryption key rotation in accordance with aspects of the present disclosure.

FIG. 6 shows a block diagram 600 of an encryption module 605 that supports key encryption key rotation in accordance with aspects of the present disclosure. The encryption module 605 may be an example of aspects of an encryption module 515 or an encryption module 710 described herein. The encryption module 605 may include a KEK identifying component 610, a DEK retrieving component 615, a DEK decrypting component 620, a DEK encrypting component 625, a DEK transmitting component 630, a KEK deletion component 635, and a KEK generating component 640. Each of these modules may communicate, directly or indirectly, with one another (e.g., via one or more buses).

The KEK identifying component 610 may identify a first KEK and a second KEK stored in the set of HSMs. In some examples, the KEK identifying component 610 may store a replay attack counter in the HSMs. In some cases, the first KEK and the second KEK are stored exclusively in the set of HSMs.

The DEK retrieving component 615 may retrieve, from a database, a set of encryption keys encrypted by the first KEK. In some cases, the set of encryption keys are provided by one or more tenants of the database based on a BYOK scheme. In some cases, the set of encryption keys are marked to prevent the set of encryption keys from being re-exported from the set of HSMs. In some cases, the database is a single server or a horizontally-scalable key/value store.

The DEK decrypting component 620 may decrypt each encryption key of the set of encryption keys using the first KEK. In some examples, the DEK decrypting component 620 may receive an encryption key encrypted by the first KEK after deleting the first KEK from the set of HSMs. In some examples, the DEK decrypting component 620 may determine the encryption key encrypted by the first KEK cannot be decrypted by the second KEK.

The DEK encrypting component 625 may re-encrypt each encryption key of the set of encryption keys with the second KEK. In some cases, each encryption key of the set of encryption keys is re-encrypted based on a key rotation process, the key rotation process triggered based on receiving a request from a tenant of the database to terminate services, receiving a request from the tenant of the database to delete a key of the set of encryption keys, determining a timer for periodically re-encrypting the set of encryption keys has expired, or a combination thereof. The DEK transmitting component 630 may transmit, to the database, the set of encrypted encryption keys encrypted by the second KEK for storage.

The KEK deletion component 635 may delete the first KEK from the set of HSMs. In some examples, the KEK deletion component 635 may determine each encryption key of the set of encryption keys is encrypted by the second KEK, where deleting the first KEK is based on the determining.

The KEK generating component 640 may generate the second KEK at a first HSM of the set of HSMs. In some examples, the KEK generating component 640 may transmit the second KEK from the first HSM to the other HSMs of the set of HSMs.

Figure 7:
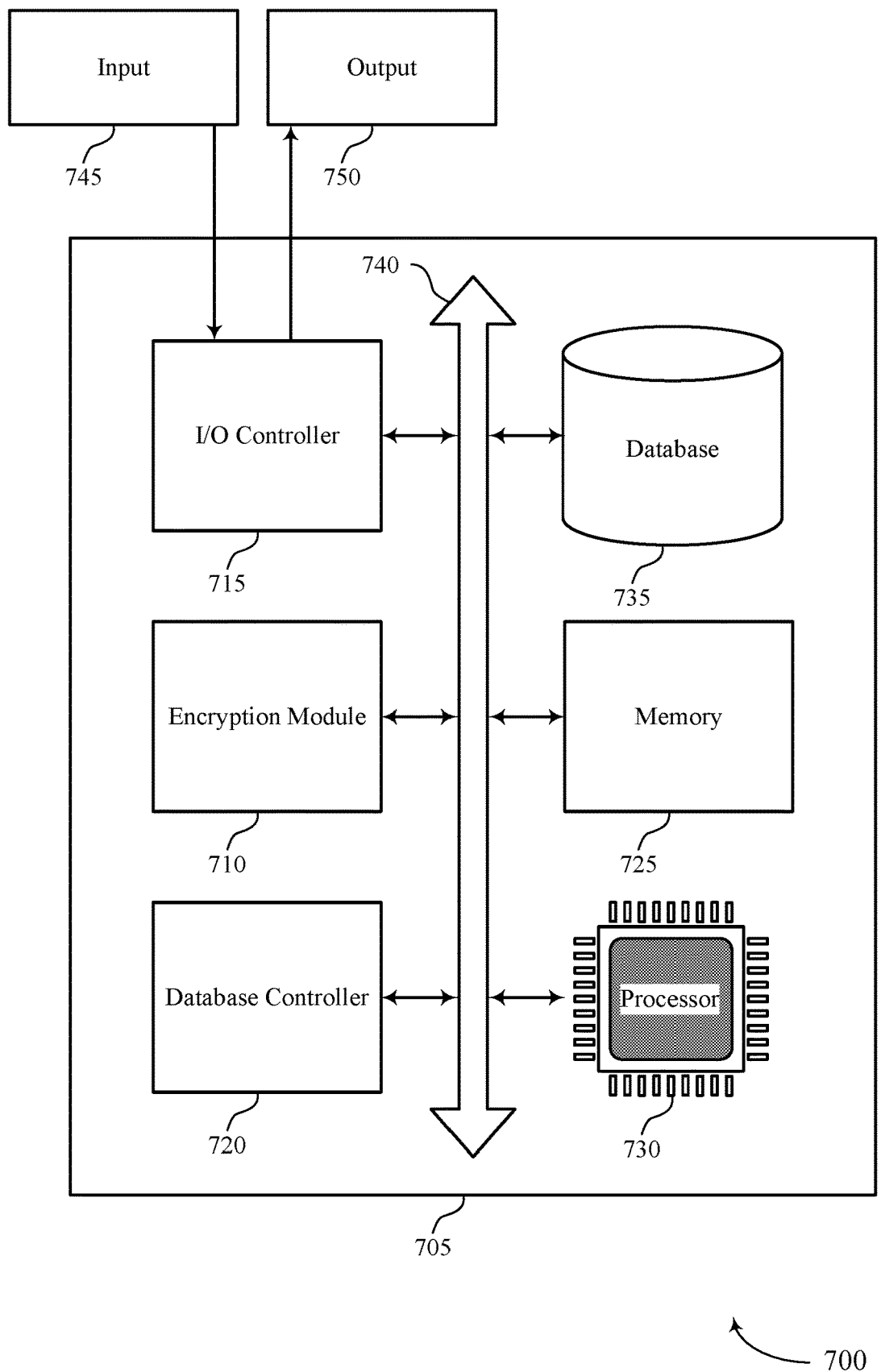
FIG. 7 shows a diagram of a system including a device that supports key encryption key rotation in accordance with aspects of the present disclosure.

FIG. 7 shows a diagram of a system 700 including a device 705 that supports key encryption key rotation in accordance with aspects of the present disclosure. The device 705 may be an example of or include the components of device 505 as described herein. The device 705 may include components for bi-directional voice and data communications including components for transmitting and receiving communications, including an encryption module 710, an I/O controller 715, a database controller 720, memory 725, a processor 730, and a database 735. These components may be in electronic communication via one or more buses (e.g., bus 740).

The encryption module 710 may identify a first KEK and a second KEK stored in the set of HSMs, retrieve, from a database, a set of encryption keys encrypted by the first KEK, decrypt each encryption key of the set of encryption keys using the first KEK, re-encrypt each encryption key of the set of encryption keys with the second KEK, transmit, to the database, the set of encrypted encryption keys encrypted by the second KEK for storage, and delete the first KEK from the set of HSMs.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WIN- DOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting key encryption key rotation).

Figure 8:
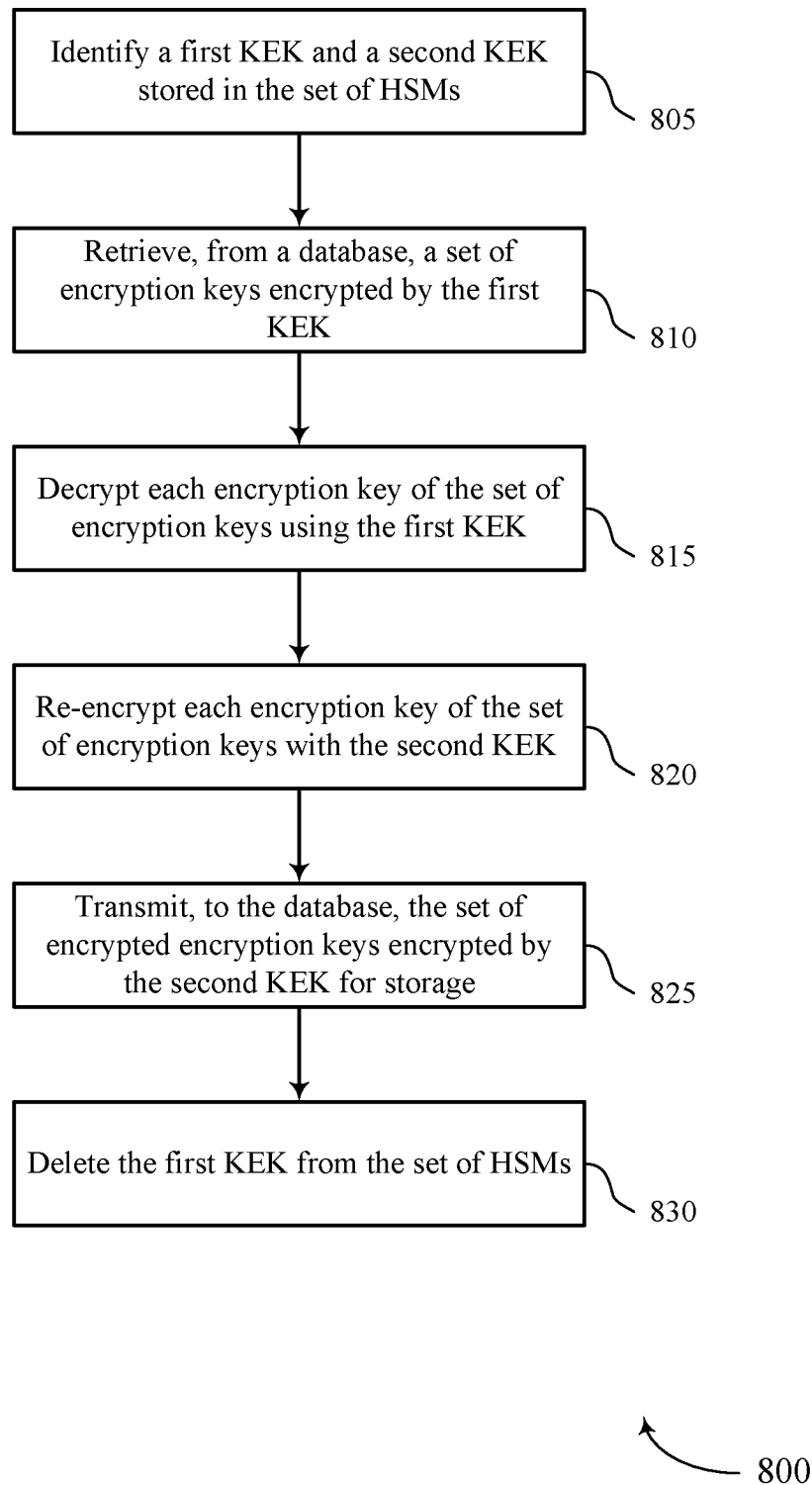
FIGS. 8 through 11 show flowcharts illustrating methods that support key encryption key rotation in accordance with aspects of the present disclosure.

FIG. 8 shows a flowchart illustrating a method 800 that supports key encryption key rotation in accordance with aspects of the present disclosure. The operations of method 800 may be implemented by an HSM or its components as described herein. In some examples, the operations of method 800 may be implemented by a set of HSMs. For example, the operations of method 800 may be performed by an encryption module as described with reference to FIGS. 5 through 7. In some examples, an HSM may execute a set of instructions to control the functional elements of the HSM to perform the functions described below. Additionally or alternatively, an HSM may perform aspects of the functions described below using special-purpose hardware.

At 805, the set of HSMs may identify a first KEK and a second KEK stored in the set of HSMs. The operations of 805 may be performed according to the methods described herein. In some examples, aspects of the operations of 805 may be performed by a KEK identifying component as described with reference to FIGS. 5 through 7.

At 810, the set of HSMs may retrieve, from a database, a set of encryption keys encrypted by the first KEK. The operations of 810 may be performed according to the methods described herein. In some examples, aspects of the operations of 810 may be performed by a DEK retrieving component as described with reference to FIGS. 5 through 7.

At 815, the set of HSMs may decrypt each encryption key of the set of encryption keys using the first KEK. The operations of 815 may be performed according to the methods described herein. In some examples, aspects of the operations of 815 may be performed by a DEK decrypting component as described with reference to FIGS. 5 through 7.

At 820, the set of HSMs may re-encrypt each encryption key of the set of encryption keys with the second KEK. The operations of 820 may be performed according to the methods described herein. In some examples, aspects of the operations of 820 may be performed by a DEK encrypting component as described with reference to FIGS. 5 through 7.

At 825, the set of HSMs may transmit, to the database, the set of encrypted encryption keys encrypted by the second KEK for storage. The operations of 825 may be performed according to the methods described herein. In some examples, aspects of the operations of 825 may be performed by a DEK transmitting component as described with reference to FIGS. 5 through 7.

At 830, the set of HSMs may delete the first KEK from the set of HSMs. The operations of 830 may be performed according to the methods described herein. In some examples, aspects of the operations of 830 may be performed by a KEK deletion component as described with reference to FIGS. 5 through 7.

Figure 9:
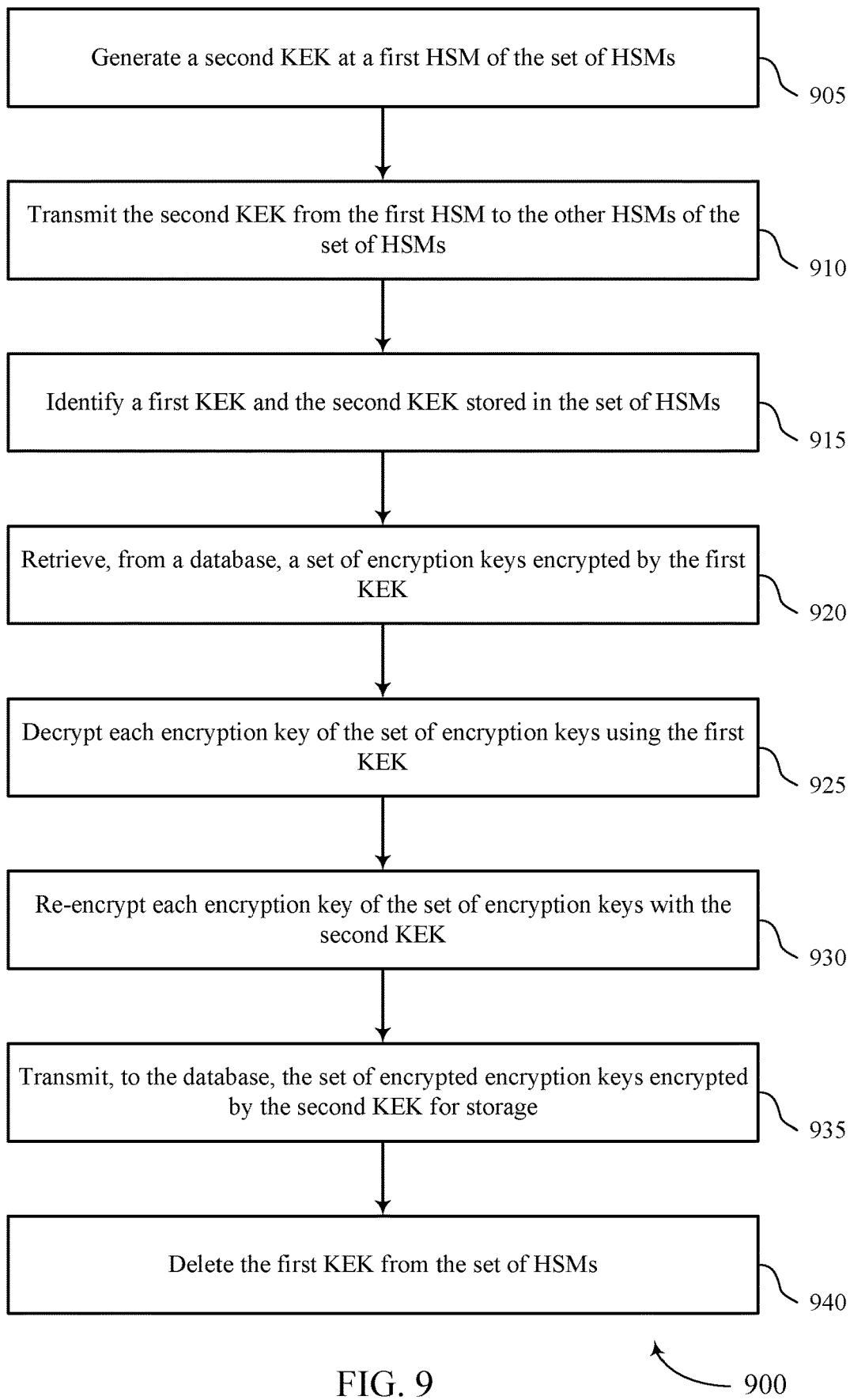

FIG. 9 shows a flowchart illustrating a method 900 that supports key encryption key rotation in accordance with aspects of the present disclosure. The operations of method 900 may be implemented by an HSM or its components as described herein. In some cases, the operations of method 900 may be implemented by a set of HSMs. For example, the operations of method 900 may be performed by an encryption module as described with reference to FIGS. 5 through 7. In some examples, an HSM may execute a set of instructions to control the functional elements of the HSM to perform the functions described below. Additionally or alternatively, an HSM may perform aspects of the functions described below using special-purpose hardware.

At 905, the set of HSMs may generate a second KEK at a first HSM of the set of HSMs. The operations of 905 may be performed according to the methods described herein. In some examples, aspects of the operations of 905 may be performed by a KEK generating component as described with reference to FIGS. 5 through 7.

At 910, the set of HSMs may transmit the second KEK from the first HSM to the other HSMs of the set of HSMs. The operations of 910 may be performed according to the methods described herein. In some examples, aspects of the operations of 910 may be performed by a KEK generating component as described with reference to FIGS. 5 through 7.

At 915, the set of HSMs may identify a first KEK and the second KEK stored in the set of HSMs. The operations of 915 may be performed according to the methods described herein. In some examples, aspects of the operations of 915 may be performed by a KEK identifying component as described with reference to FIGS. 5 through 7.

At 920, the set of HSMs may retrieve, from a database, a set of encryption keys encrypted by the first KEK. The operations of 920 may be performed according to the methods described herein. In some examples, aspects of the operations of 920 may be performed by a DEK retrieving component as described with reference to FIGS. 5 through 7.

At 925, the set of HSMs may decrypt each encryption key of the set of encryption keys using the first KEK. The operations of 925 may be performed according to the methods described herein. In some examples, aspects of the operations of 925 may be performed by a DEK decrypting component as described with reference to FIGS. 5 through 7.

At 930, the set of HSMs may re-encrypt each encryption key of the set of encryption keys with the second KEK. The operations of 930 may be performed according to the methods described herein. In some examples, aspects of the operations of 930 may be performed by a DEK encrypting component as described with reference to FIGS. 5 through 7.

At 935, the set of HSMs may transmit, to the database, the set of encrypted encryption keys encrypted by the second KEK for storage. The operations of 935 may be performed according to the methods described herein. In some examples, aspects of the operations of 935 may be performed by a DEK transmitting component as described with reference to FIGS. 5 through 7.

At 940, the set of HSMs may delete the first KEK from the set of HSMs. The operations of 940 may be performed according to the methods described herein. In some examples, aspects of the operations of 940 may be performed by a KEK deletion component as described with reference to FIGS. 5 through 7.

Figure 10:
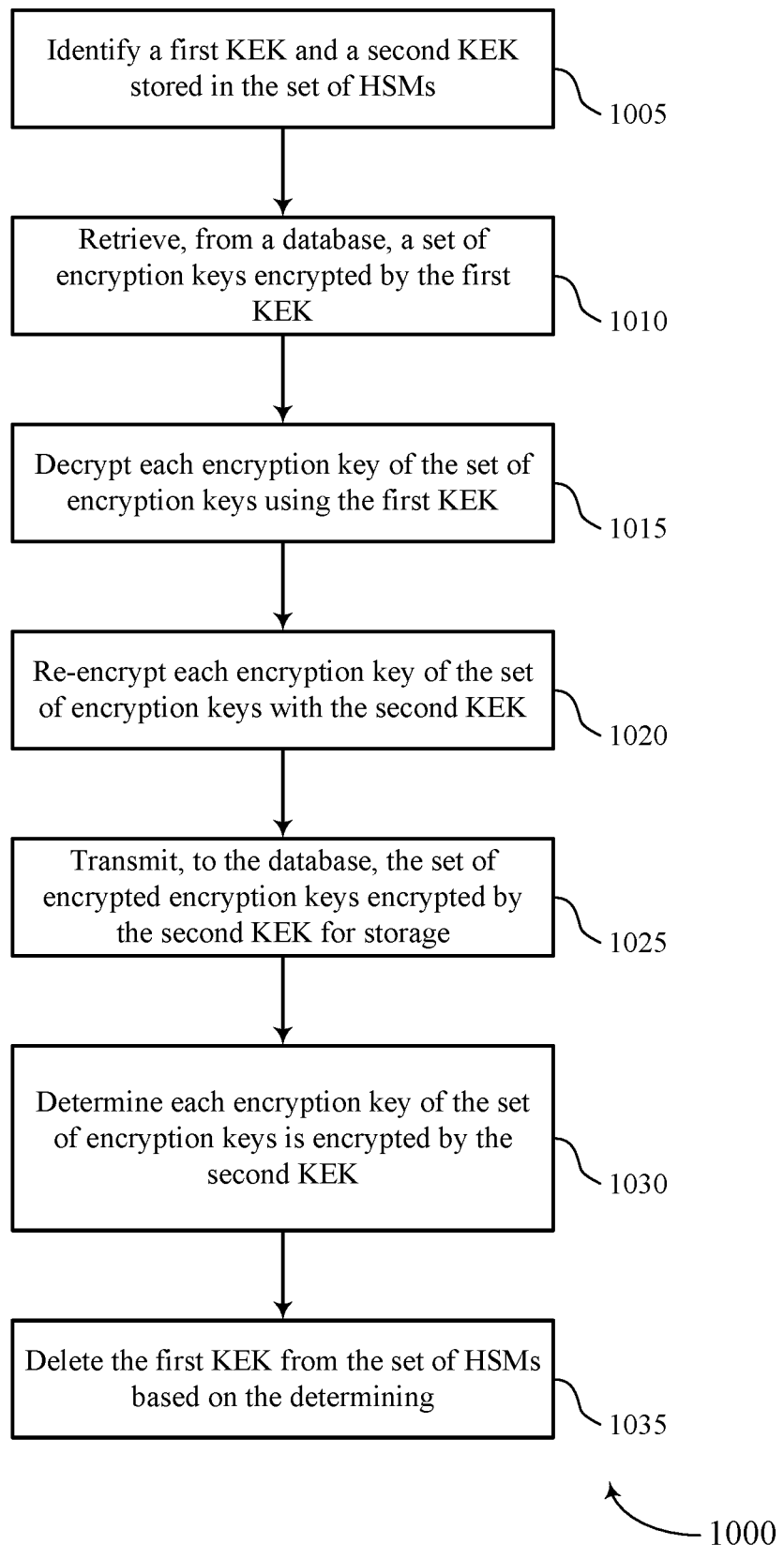

FIG. 10 shows a flowchart illustrating a method 1000 that supports key encryption key rotation in accordance with aspects of the present disclosure. The operations of method 1000 may be implemented by an HSM or its components as described herein. In some cases, the operations of method 1000 may be implemented by a set of HSMs. For example, the operations of method 1000 may be performed by an encryption module as described with reference to FIGS. 5 through 7. In some examples, an HSM may execute a set of instructions to control the functional elements of the HSM to perform the functions described below. Additionally or alternatively, an HSM may perform aspects of the functions described below using special-purpose hardware.

At 1005, the set of HSMs may identify a first KEK and a second KEK stored in the set of HSMs. The operations of 1005 may be performed according to the methods described herein. In some examples, aspects of the operations of 1005 may be performed by a KEK identifying component as described with reference to FIGS. 5 through 7.

At 1010, the set of HSMs may retrieve, from a database, a set of encryption keys encrypted by the first KEK. The operations of 1010 may be performed according to the methods described herein. In some examples, aspects of the operations of 1010 may be performed by a DEK retrieving component as described with reference to FIGS. 5 through 7.

At 1015, the set of HSMs may decrypt each encryption key of the set of encryption keys using the first KEK. The operations of 1015 may be performed according to the methods described herein. In some examples, aspects of the operations of 1015 may be performed by a DEK decrypting component as described with reference to FIGS. 5 through 7.

At 1020, the set of HSMs may re-encrypt each encryption key of the set of encryption keys with the second KEK. The operations of 1020 may be performed according to the methods described herein. In some examples, aspects of the operations of 1020 may be performed by a DEK encrypting component as described with reference to FIGS. 5 through 7.

At 1025, the set of HSMs may transmit, to the database, the set of encrypted encryption keys encrypted by the second KEK for storage. The operations of 1025 may be performed according to the methods described herein. In some examples, aspects of the operations of 1025 may be performed by a DEK transmitting component as described with reference to FIGS. 5 through 7.

At 1030, the set of HSMs may determine each encryption key of the set of encryption keys is encrypted by the second KEK. The operations of 1030 may be performed according to the methods described herein. In some examples, aspects of the operations of 1030 may be performed by a KEK deletion component as described with reference to FIGS. 5 through 7.

At 1035, the set of HSMs may delete the first KEK from the set of HSMs based on the determining each encryption key of the set of encryption keys is encrypted by the second KEK. The operations of 1035 may be performed according to the methods described herein. In some examples, aspects of the operations of 1035 may be performed by a KEK deletion component as described with reference to FIGS. 5 through 7.

Figure 11:
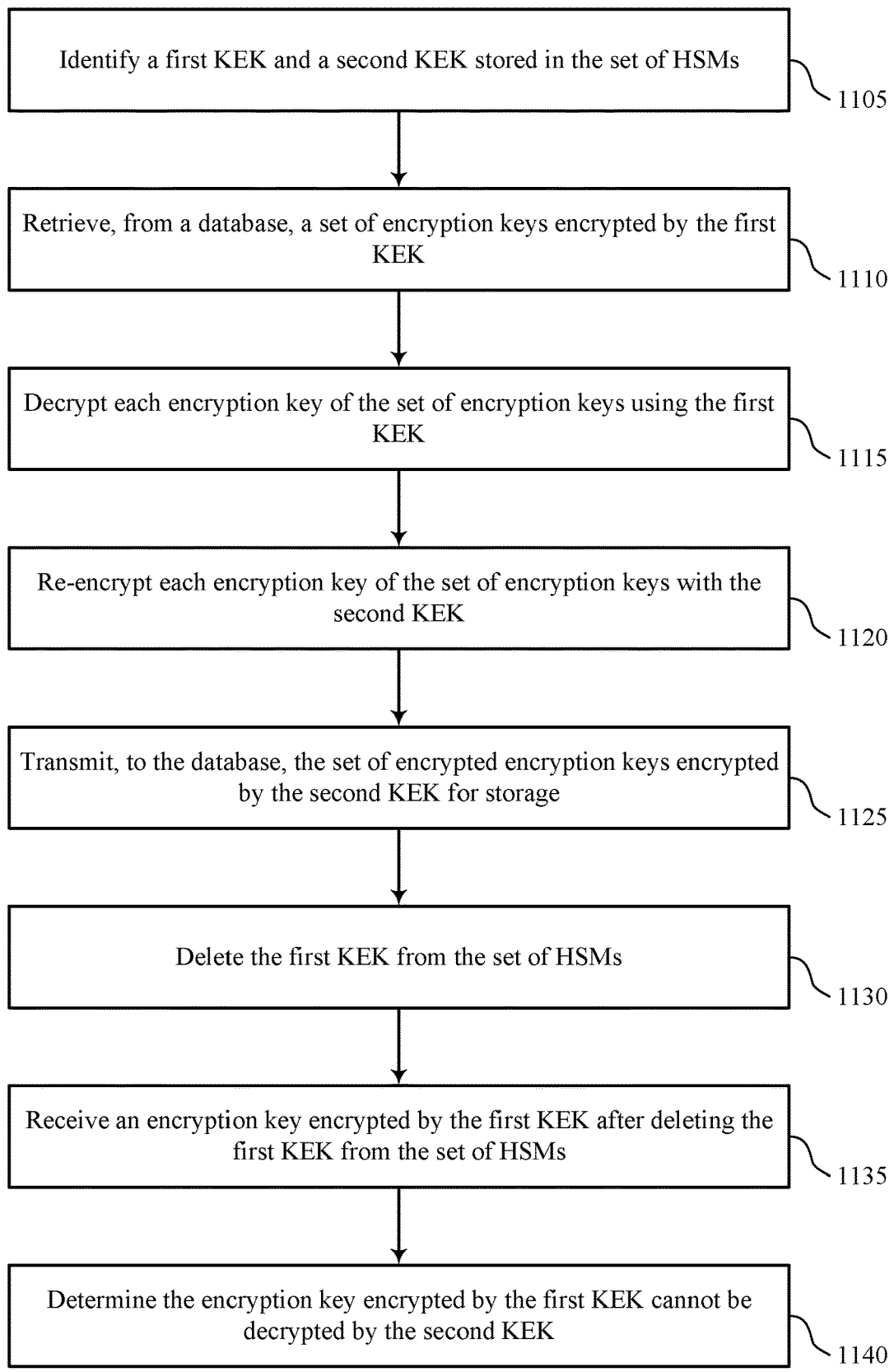

FIG. 11 shows a flowchart illustrating a method 1100 that supports key encryption key rotation in accordance with aspects of the present disclosure. The operations of method 1100 may be implemented by an HSM or its components as described herein. In some cases, the operations of method 1100 may be implemented by a set of HSMs. For example, the operations of method 1100 may be performed by an encryption module as described with reference to FIGS. 5 through 7. In some examples, an HSM may execute a set of instructions to control the functional elements of the HSM to perform the functions described below. Additionally or alternatively, an HSM may perform aspects of the functions described below using special-purpose hardware.

At 1105, the set of HSMs may identify a first KEK and a second KEK stored in the set of HSMs. The operations of 1105 may be performed according to the methods described herein. In some examples, aspects of the operations of 1105 may be performed by a KEK identifying component as described with reference to FIGS. 5 through 7.

At 1110, the set of HSMs may retrieve, from a database, a set of encryption keys encrypted by the first KEK. The operations of 1110 may be performed according to the methods described herein. In some examples, aspects of the operations of 1110 may be performed by a DEK retrieving component as described with reference to FIGS. 5 through 7.

At 1115, the set of HSMs may decrypt each encryption key of the set of encryption keys using the first KEK. The operations of 1115 may be performed according to the methods described herein. In some examples, aspects of the operations of 1115 may be performed by a DEK decrypting component as described with reference to FIGS. 5 through 7.

At 1120, the set of HSMs may re-encrypt each encryption key of the set of encryption keys with the second KEK. The operations of 1120 may be performed according to the methods described herein. In some examples, aspects of the operations of 1120 may be performed by a DEK encrypting component as described with reference to FIGS. 5 through 7.

At 1125, the set of HSMs may transmit, to the database, the set of encrypted encryption keys encrypted by the second KEK for storage. The operations of 1125 may be performed according to the methods described herein. In some examples, aspects of the operations of 1125 may be performed by a DEK transmitting component as described with reference to FIGS. 5 through 7.

At 1130, the set of HSMs may delete the first KEK from the set of HSMs. The operations of 1130 may be performed according to the methods described herein. In some examples, aspects of the operations of 1130 may be performed by a KEK deletion component as described with reference to FIGS. 5 through 7.

At 1135, the set of HSMs may receive an encryption key encrypted by the first KEK after deleting the first KEK from the set of HSMs. The operations of 1135 may be performed according to the methods described herein. In some examples, aspects of the operations of 1135 may be performed by a DEK decrypting component as described with reference to FIGS. 5 through 7.

At 1140, the set of HSMs may determine the encryption key encrypted by the first KEK cannot be decrypted by the second KEK. The operations of 1140 may be performed according to the methods described herein. In some examples, aspects of the operations of 1140 may be performed by a DEK decrypting component as described with reference to FIGS. 5 through 7.

A method of encryption key handling at a set of HSMs is described. The method may include identifying a first KEK and a second KEK stored in the set of HSMs, retrieving, from a database, a set of encryption keys encrypted by the first KEK, decrypting each encryption key of the set of encryption keys using the first KEK, re-encrypting each encryption key of the set of encryption keys with the second KEK, transmitting, to the database, the set of encrypted encryption keys encrypted by the second KEK for storage, and deleting the first KEK from the set of HSMs.

An apparatus for encryption key handling at a set of HSMs is described. The apparatus may include a processor, memory in electronic communication with the processor, and instructions stored in the memory. The instructions may be executable by the processor to cause the apparatus to identify a first key encryption key (KEK) and a second KEK stored in the set of HSMs, retrieve, from a database, a set of encryption keys encrypted by the first KEK, decrypt each encryption key of the set of encryption keys using the first KEK, re-encrypt each encryption key of the set of encryption keys with the second KEK, transmit, to the database, the set of encrypted encryption keys encrypted by the second KEK for storage, and delete the first KEK from the set of HSMs.

Another apparatus for encryption key handling at a set of HSMs is described. The apparatus may include means for identifying a first KEK and a second KEK stored in the set of HSMs, retrieving, from a database, a set of encryption keys encrypted by the first KEK, decrypting each encryption key of the set of encryption keys using the first KEK, re-encrypting each encryption key of the set of encryption keys with the second KEK, transmitting, to the database, the set of encrypted encryption keys encrypted by the second KEK for storage, and deleting the first KEK from the set of HSMs.

A non-transitory computer-readable medium storing code for encryption key handling at a set of HSMs is described. The code may include instructions executable by a processor to identify a first KEK and a second KEK stored in the set of HSMs, retrieve, from a database, a set of encryption keys encrypted by the first KEK, decrypt each encryption key of the set of encryption keys using the first KEK, re-encrypt each encryption key of the set of encryption keys with the second KEK, transmit, to the database, the set of encrypted encryption keys encrypted by the second KEK for storage, and delete the first KEK from the set of HSMs.

Some examples of the method, apparatuses, and non-transitory computer-readable medium described herein may further include operations, features, means, or instructions for generating the second KEK at a first HSM of the set of HSMs and transmitting the second KEK from the first HSM to the other HSMs of the set of HSMs.

Some examples of the method, apparatuses, and non-transitory computer-readable medium described herein may further include operations, features, means, or instructions for determining each encryption key of the set of encryption keys may be encrypted by the second KEK, where deleting the first KEK may be based on the determining.

Some examples of the method, apparatuses, and non-transitory computer-readable medium described herein may further include operations, features, means, or instructions for receiving an encryption key encrypted by the first KEK after deleting the first KEK from the set of HSMs and determining the encryption key encrypted by the first KEK cannot be decrypted by the second KEK.

In some examples of the method, apparatuses, and non-transitory computer-readable medium described herein, each encryption key of the set of encryption keys may be re-encrypted based on a key rotation process, the key rotation process triggered based on receiving a request from a tenant of the database to terminate services, receiving a request from the tenant of the database to delete a key of the set of encryption keys, determining a timer for periodically re-encrypting the set of encryption keys may have expired, or a combination thereof.

Some examples of the method, apparatuses, and non-transitory computer-readable medium described herein may further include operations, features, means, or instructions for storing a replay attack counter in the HSMs.

In some examples of the method, apparatuses, and non-transitory computer-readable medium described herein, the set of encryption keys may be provided by one or more tenants of the database based on a BYOK scheme.

In some examples of the method, apparatuses, and non-transitory computer-readable medium described herein, the set of encryption keys may be marked to prevent the set of encryption keys from being re-exported from the set of HSMs.

In some examples of the method, apparatuses, and non-transitory computer-readable medium described herein, the first KEK and the second KEK may be stored exclusively in the set of HSMs.

In some examples of the method, apparatuses, and non-transitory computer-readable medium described herein, the database may be a single server or a horizontally-scalable key/value store.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of encryption key handling at a set of hardware security modules (HSMs), comprising:
   generating, at a first HSM of the set of HSMs, a second key encryption key (KEK) based at least in part on an initiation of a key rotation process;
   propagating the second KEK to a different second HSM of the set of HSMs and to the other HSMs of the set of HSMs;
   identifying, at the second HSM, a first KEK and the second KEK stored in the set of HSMs;
   retrieving, from a database and at the second HSM, a set of encryption keys encrypted by the first KEK;
   decrypting, at the second HSM, each encryption key of the set of encryption keys using the first KEK;
   re-encrypting, at the second HSM, each encryption key of the set of encryption keys with the second KEK;
   determining, at the second HSM, each encryption key of the set of encryption keys is encrypted by the second KEK;
   transmitting, from the second HSM to the database, the set of encrypted encryption keys encrypted by the second KEK for storage, and an identifier associated with the second KEK; and
   deleting the first KEK from the set of HSMs, wherein deleting the first KEK is based at least in part on determining each encryption key of the set of encryption keys is encrypted by the second KEK.

2. The method of claim 1, further comprising:
   receiving an encryption key encrypted by the first KEK after deleting the first KEK from the set of HSMs; and
   determining the encryption key encrypted by the first KEK cannot be decrypted by the second KEK.

3. The method of claim 1, wherein each encryption key of the set of encryption keys is re-encrypted based at least in part on a key rotation process, the key rotation process triggered based at least in part on receiving a request from a tenant of the database to terminate services, receiving a request from the tenant of the database to delete a key of the set of encryption keys, determining a timer for periodically re-encrypting the set of encryption keys has expired, or a combination thereof.

4. The method of claim 1, further comprising:
storing a replay attack counter in the HSMs.

5. The method of claim 1, wherein the set of encryption keys are provided by one or more tenants of the database based at least in part on a bring your own key (BYOK) scheme.

6. The method of claim 5, wherein the set of encryption keys are marked to prevent the set of encryption keys from being re-exported from the set of HSMs.

7. The method of claim 5, wherein the first KEK and the second KEK are stored exclusively in the set of HSMs.

8. The method of claim 5, wherein the database is a single server or a horizontally-scalable key/value store.

9. An apparatus for encryption key handling at a set of hardware security modules (HSMs), comprising:
a processor;
memory in electronic communication with the processor; and
instructions stored in the memory and executable by the processor to cause the apparatus to:
generate, at a first HSM of the set of HSMs, a second key encryption key (KEK) based at least in part on an initiation of a key rotation process;
propagate the second KEK to a different second HSM of the set of HSMs and to the other HSMs of the set of HSMs;
identify, at the second HSM, a first KEK and the second KEK stored in the set of HSMs;
retrieve, from a database and at the second HSM, a set of encryption keys encrypted by the first KEK;
decrypt, at the second HSM, each encryption key of the set of encryption keys using the first KEK;
re-encrypt, at the second HSM, each encryption key of the set of encryption keys with the second KEK;
determine, at the second HSM, each encryption key of the set of encryption keys is encrypted by the second KEK;
transmit, from the second HSM to the database, the set of encrypted encryption keys encrypted by the second KEK for storage, and an identifier associated with the second KEK; and
delete the first KEK from the set of HSMs, wherein deleting the first KEK is based at least in part on determining each encryption key of the set of encryption keys is encrypted by the second KEK.

10. The apparatus of claim 9, wherein the instructions are further executable by the processor to cause the apparatus to:
receive an encryption key encrypted by the first KEK after deleting the first KEK from the set of HSMs; and
determine the encryption key encrypted by the first KEK cannot be decrypted by the second KEK.

11. The apparatus of claim 9, wherein each encryption key of the set of encryption keys is re-encrypted based at least in part on a key rotation process, the key rotation process triggered based at least in part on receiving a request from a tenant of the database to terminate services, receiving a request from the tenant of the database to delete a key of the set of encryption keys, determining a timer for periodically re-encrypting the set of encryption keys has expired, or a combination thereof.

12. The apparatus of claim 9, wherein the set of encryption keys are provided by one or more tenants of the database based at least in part on a bring your own key (BYOK) scheme.

13. The apparatus of claim 9, wherein the first KEK and the second KEK are stored exclusively in the set of HSMs.

14. A non-transitory computer-readable medium storing code for encryption key handling at a set of hardware security modules (HSMs), the code comprising instructions executable by a processor to:
generate, at a first HSM of the set of HSMs, a second key encryption key (KEK) based at least in part on an initiation of a key rotation process;
propagate the second KEK to a different second HSM of the set of HSMs and to the other HSMs of the set of HSMs;
identify, at the second HSM, a first KEK and the second KEK stored in the set of HSMs;
retrieve, from a database and at the second HSM, a set of encryption keys encrypted by the first KEK;
decrypt, at the second HSM, each encryption key of the set of encryption keys using the first KEK;
re-encrypt, at the second HSM, each encryption key of the set of encryption keys with the second KEK;
determine, at the second HSM, each encryption key of the set of encryption keys is encrypted by the second KEK;
transmit, from the second HSM to the database, the set of encrypted encryption keys encrypted by the second KEK for storage, and an identifier associated with the second KEK; and
delete the first KEK from the set of HSMs, wherein deleting the first KEK is based at least in part on determining each encryption key of the set of encryption keys is encrypted by the second KEK.

* * * * *